United States Patent [19]

Alig

[11] 4,197,200
[45] Apr. 8, 1980

[54] SHIPBOARD BLACKWATER PHYSICAL/CHEMICAL TREATMENT SYSTEM

[75] Inventor: Craig S. Alig, Arnold, Md.

[73] Assignee: The United States of America as represented by the Secretary of the Navy, Washington, D.C.

[21] Appl. No.: 937,639

[22] Filed: Aug. 29, 1978

[51] Int. Cl.² .............................................. C02B 1/38
[52] U.S. Cl. ................................. 210/104; 210/118; 210/143; 210/195.1; 210/199; 210/254
[58] Field of Search .................................. 210/60–62, 210/63 Z, 64, 104, 118, 130, 132, 136, 139, 143, 152, 167, 192, 195 R, 198 R, 199, 202, 205, 206, 254, 258, 259

[56] References Cited

U.S. PATENT DOCUMENTS

| 3,362,697 | 5/1968 | Silva ....................................... 210/192 |
| 3,779,909 | 12/1973 | Wisfield ................................. 210/64 |
| 3,784,008 | 1/1974 | Troglione ............................. 210/104 |
| 3,856,671 | 12/1974 | Lee et al. ............................. 210/63 Z |
| 4,009,104 | 2/1977 | Behrenot et al. ....................... 210/62 |
| 4,040,956 | 8/1977 | Selwitz .................................. 210/64 |
| 4,053,399 | 10/1977 | Donelly et al. ...................... 210/152 |
| 4,072,613 | 2/1978 | Alig .................................. 210/198 R |

FOREIGN PATENT DOCUMENTS 2401608  8/1974  Fed. Rep. of Germany ............. 210/64

Primary Examiner—Charles N. Hart
Assistant Examiner—Peter A. Hruskoci
Attorney, Agent, or Firm—R. S. Sciascia; Q. E. Hodges

[57] ABSTRACT

An automatic dual-mode shipboard wastewater treatment system employing ozone for disinfection of the primary effluent. Solids are removed and pumped, for example, to the ship's boiler or other equipment for incineration, while the liquid waste is pumped through a series of ozone reactors and then to a holding tank from which it is discharged overboard, after accumulating to a predetermined level. The system operates continuously by recirculating the effluent, during low flow periods, between a second holding tank and the ozone reactors.

6 Claims, 1 Drawing Figure

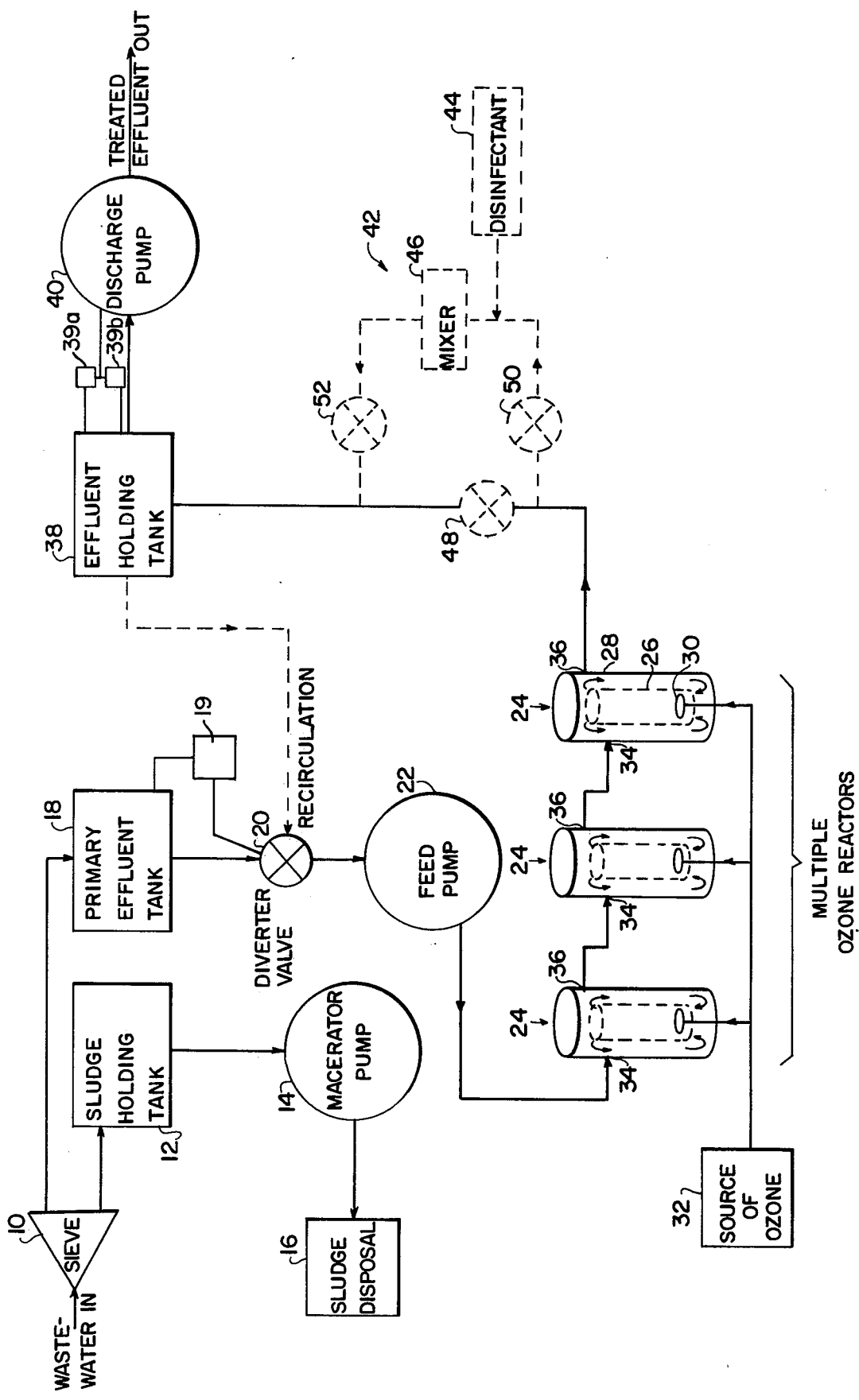

⋯

SHIPBOARD BLACKWATER PHYSICAL/CHEMICAL TREATMENT SYSTEM

The invention described herein may be manufactured and used by or for the Government of the United States of America for governmental purposes without the payment of any royalties thereon or therefor.

BACKGROUND OF THE INVENTION

Increased environmental awareness has led to more stringent standards and regulations regarding the discharge of effluent from vessels. To comply with these standards various marine sanitation devices have been developed. Systems designed to treat human waste, or "blackwater", must be capable of removing suspended solids, removing dissolved organic solids, and disinfecting the effluent prior to discharge. In addition, a system intended for use aboard ship must satisfy size, efficiency, and reliability constraints without requiring constant monitoring by an operator.

Marine sanitation systems currently in use remove suspended solids from wastewater by such methods as screening, settling, filtering, and flotation. These methods are effective, but they require varying degrees of maintenance and operator control. A common method of removing both suspended and dissolved solids is biological digestion, but this method has not been found satisfactory for shipboard use because of the relatively long treatment times required. Disinfection of the effluent prior to discharge has primarily been accomplished by chlorination. However, chlorination leaves an undesirable chemical residue in the effluent which is often excessive and thus harmful to aquatic life.

Thus, there is a need for a wastewater system suitable for use aboard ship which is neither oversized, complicated, nor costly and does not require an inordinate amount of operator attention or maintenance.

SUMMARY OF THE INVENTION

Accordingly, the present invention overcomes many of the disadvantages of prior art shipboard marine sanitation devices by providing a self-contained wastewater treatment system that is automatic, efficient, and requires a minimum of operator attention and maintenance.

In the present system, wastewater first flows into a screen-type solids separation device. The solid waste, or sludge, then flows into a holding tank from which it is pumped by a macerator/transfer pump into the ship's boilers for incineration or otherwise disposed of. The liquid waste flows from the solids separation device into a primary effluent holding tank. In the treatment mode of the present invention, the wastewater is then pumped through a diverter valve to a series of ozone reactors wherein the effluent is mixed with ozone to destroy bacteria, oxidize any remaining suspended solids and some dissolved organic matter, remove odor and color, and oxygenate the effluent. The wastewater, now called the effluent, accumulates in a second holding tank from which it is pumped overboard.

During low wastewater flow periods the system operates in a recirculation mode, in which the diverter valve allows the effluent to recycle through the ozone reactors until wastewater again begins to accumulate in the primary effluent holding tank.

The dual-mode capacity of the present system permits continuous operation, thereby eliminating cyclic shutdown of the pumps and ozone generators while enabling automatic operation and control.

OBJECTS OF THE INVENTION

It is therefore an object of the present invention to provide a wastewater treatment system having a minimum chemical residue in its effluent.

Another object of the present invention is to provide a wastewater treatment system suitable for use aboard ship.

Still another object of the present invention is to provide a wastewater treatment system that operates in both a treatment mode and a recirculation mode.

A further object of the present invention is to provide a wastewater treatment system that operates continuously and automatically.

A still further object of the present invention is to provide a system that utilizes ozone for the treatment of wastewater containing relatively high concentrations of suspended solids.

BRIEF DESCRIPTION OF THE DRAWING

Other objects and many of the attendant advantages of the present invention will be readily apparent as the invention becomes better understood by reference to the following detailed description with the appended claims, when considered in conjunction with the accompanying drawing wherein:

The FIGURE is a schematic diagram of a wastewater treatment system in accordance with the present invention.

DESCRIPTION OF THE PREFERRED EMBODIMENT

Referring now to the drawing, wherein like reference numerals designate the same or corresponding parts, there is shown in the FIGURE an ozone type wastewater treatment system suitable for shipboard use. Wastewater flows from the ship's sewage collection system into a sieve 10 which removes a large portion of the solids therefrom. Sieve 10 is advantageous as a solids separation device because it is relatively inexpensive, has no moving parts, and requires little or no supervision. An example of a sieve that has been found to be effective in the present system is the "Hydrasieve" screen manufactured by Combustion Engineering, Inc. The solids that are removed from the wastewater by sieve 10 accumulate in a sludge holding tank 12. When the sludge holding tank 12 is filled, the sludge is pumped by a macerator/transfer pump 14 to any suitable sludge disposal means 16. One advantageous sludge disposal means comprises incineration by injection of the sludge into the ship's boiler, such as the Babcock & Wilcox Co. Sludge Incineration System. In the present embodiment the operation of macerator/transfer pump 14 and sludge disposal means 16 is automated, said operation being initiated, for example, by a level sensor in tank 12. Manual operation may be effected, however, by having a level sensor in tank 12 signal an operator who then starts pump 14.

The aqueous phase of the wastewater, referred to as the primary effluent, passes through sieve 10 and collectors in a primary effluent tank 18. The primary effluent tank 18 fills at a rate corresponding to the incoming wastewater flow rate, and has sufficient capacity to retain flows during peak use periods when the wastewater flow rate might exceed the treatment rate of the remainder of the system. In the treatment mode of the present dual-mode system, the primary effluent is pumped from tank 18 through a diverter valve 20 by means of a feed pump 22. In an automated system, diverter valve 20 may conveniently be a motor operated ball valve. The primary effluent next flows through multiple concentric cylinder ozone reactors 24 which are connected in series. That is, the outlet of the first ozone reactor is connected to the inlet of the second ozone reactor, and so forth. Although three ozone reactors 24 are shown in the FIGURE, the actual number of reactors in a particular installation will depend upon the amount and the flow rate of the wastewater to be treated. A sufficient number of reactors 24 must be used to properly ozonate the primary effluent.

The ozone reactors in the present system are the subject of my U.S. Pat. No. 4,072,613, issued Feb. 7, 1978, and assigned to the assignee of the present invention. Each ozone reactor 24 comprises an inner cylinder 26 contained within and spaced from an outer cylinder 28, said outer cylinder 28 being sealed at each end to form a closed chamber. A sparger 30 is mounted within the lower portion of inner cylinder 26 and connected to a source of ozone under pressure 32. The ozone source 32 can use any of several available methods to produce ozone, for example, an air compressor and drier connected to an electric arc ozone generator. Sparger 30 operates to form small bubbles of ozone, which facilitates the interaction of the ozone with the primary effluent. In operation, as shown by the arrows within each reactor 24 in the FIGURE, primary effluent enters an inlet 34, flows downward between the two cylinders then up through inner cylinder 26 where it is mixed with the gas bubbles containing ozone. The flow of gas bubbles forces the primary effluent to flow up through cylinder 26 and recirculate back down between the two cylinders, thus extending the treatment time within each reactor 24. When the level of primary effluent within the reactor rises to the level of an outlet 36, the effluent passes out of the reactor and flows to the inlet of the next reactor in the series. The high ozone concentration and long contact time provided by the reactors 24 destroys bacteria and removes color and odor from the primary effluent. The ozone reactors further operate to remove more of the remaining fine suspended solids and dissolved organic matter, and to oxygenate the liquid, now referred to as the effluent, that flows from the last reactor in the series.

The effluent flows from the last ozone reactor to an effluent holding tank 38 where it accumulates until the tank is full, at which time the effluent is pumped overboard by a discharge pump 40. Pump 40 may be started and stopped, for example, by high 39(a) and low 39(b) level sensors, respectively, in tank 38. The low level sensor should be located in a position so that when pump 40 shuts off there will be sufficient effluent remaining in tank 38 for recirculation as described below.

During periods of low wastewater flow when primary effluent tank 18 is nearly empty, fluid level sensing means 19 causes the system to change from the treatment mode to a recirculation mode. To effect the mode change, diverter valve 20 changes position and prevents the flow of primary effluent from tank 18 while at the same time allowing effluent to flow from effluent holding tank 38 through valve 20 and back through the ozone reactors 24. The recirculation mode continues until primary effluent again begins to accumulate in tank 18, at which time diverter valve 20 changes back to its original position and returns the system to the treatment mode. The recirculation mode permits continuous operation of feed pump 22 and the ozone generator in source 32. This eliminates the cyclic shutdown of these components, thus simplifying the automatic operation and control of the system.

If environmental regulations should require a certain level of chlorine in the treated effluent, or if bacterial regrowth is found to occur in effluent holding tank 38 and the discharge piping, then a disinfection subsystem 42 may be necessary. A disinfection subsystem 42 may advantageously be installed downstream of the last ozone reactor 24, as shown in the FIGURE. A typical subsystem 42 may comprise a supply of disinfectant 44 followed by a mixer 46, and valves 48, 50, and 52 to meter the flow of effluent through the subsystem. Operation and control of valves 48, 50, and 52, mixer 46, and disinfectant supply 44 may be either automatic or manual as desired.

Thus, there has been provided by the present invention an automatic ozone wastewater treatment system suitable for shipboard installation and capable of discharging a treated effluent having little or no residual chlorine, thereby satisfying environmental constraints concerning marine sanitation devices.

Obviously many modifications and variations of the present invention are possible in the light of the above teachings. For example, ozone can be vented from the reactors 24 and sparged through tank 18 in order to pretreat the primary effluent, or, an air/ozone mixture could be sparged into the sludge holding tank 12 to prevent septic conditions from developing and to eliminate the generation of potentially harmful gases. It is therefore to be understood that within the scope of the appended claims, the invention may be practiced otherwise than as specifically described herein.

What is claimed is:

1. In a wastewater treatment system a liquid recycling system comprising:
   a first holding tank for receiving wastewater;
   treatment means connected to said first tank for receiving wastewater from said first tank and treating the wastewater to destroy bacteria and produce an effluent;
   a second holding tank connected to said treatment means for receiving the effluent;
   a diverter valve connected to said first and second tanks, said diverter valve selectively transferring wastewater directly from said first tank or said effluent from said second tank to said treatment means; and
   a distance conduit connected to said second tank for transferring purified effluent from the treatment system, the effluent in said second tank being selectively transferred either to said diverter valve or said discharge conduit; and
   means connected to said first tank and to said diverter valve, said means responsive to a predetermined low level of wastewater in said first tank to cause said diverter valve to permit flow of effluent from said second tank through said diverter valve to said treatment means while preventing flow of wastewater from said first tank and through said diverter valve.

2. The system of claim 1, wherein said treatment means includes a plurality of serially interconnected ozone reactors configured to supply a high concentration of ozone to the wastewater.

3. The system of claim 1, further comprising means connected to said treatment means and said second holding tank for selectively disinfecting the effluent from said treatment means.

4. A wastewater treatment system comprising:
- a first fluid holding tank for receiving untreated wastewater;
- treatment means connected to said first tank for receiving wastewater from said first tank and supplying ozone from an external source to contact the wastewater for producing an effluent;
- a second fluid holding tank connected to said treatment means for receiving the effluent therefrom;
- a diverter valve connected to said first and second tanks and to said treatment means for selectively directing the flow of wastewater from said first tank or said effluent from said second tank to said treatment means;
- a feed pump connected to said diverter valve and said treatment means for drawing fluid through said diverter valve and pumping such fluid to said treatment means;
- a discharge conduit attached to said second tank for transferring effluent from the treatment system, the effluent in said second tank being transferred either to said diverter valve or said discharge conduit;
- a discharge means connected to said discharge conduit for discharging effluent from said second tank through said discharge conduit;
- means connected to said first tank and to said diverter valve responsive to a predetermined low wastewater level in said first tank and causing said diverter valve to permit flow of effluent from said second tank through said diverter valve into said treatment means while preventing flow of wastewater from said first tank to said diverter valve; and
- a level sensing means connected to said second tank and said discharge means, said level sensing means sensing a predetermined low effluent level in said second tank and functioning to stop the flow of effluent from said second tank to said discharge conduit.

5. A wastewater treatment system comprising:
- a sieve for separating solids from the aqueous phase of the incoming wastewater;
- means connected to said sieve for disposal of said separated solids including a solids holding tank for collecting the solids, means for incinerating the solids and means for transferring the solids from the solids tank to the incinerating means;
- a first fluid holding tank connected to said sieve for receiving the aqueous wastewater;
- a plurality of serially interconnected ozone reactors connected to said first tank for supplying a high concentration of ozone to the wastewater received from said first tank;
- a second fluid holding tank connected to said ozone reactors for receiving effluent therefrom;
- means for recirculating the effluent between said second tank and said ozone reactors including a diverter valve connected in the wastewater flow stream between said first tank and said ozone reactors, a connection extending between said second tank and said diverter valve and means connected to said first tank and said diverter responsive to a predetermined low wastewater level in said first tank and causing said diverter valve to permit flow of effluent from said second tank through said diverter valve and into said treatment means while preventing flow of wastewater from said first tank to said diverter valve;
- means connected to said diverter valve and said ozone reactors for pumping fluid to said ozone reactors; and
- means for selectively disinfecting the effluent that flows from said ozone reactors, said disinfecting means being connected to said system at a point downstream of said ozone reactors and upstream of said second tank.

6. The system of claim 5, wherein said disinfecting means comprises:
- a first valve inserted in the wastewater flow stream between said ozone reactors and said second liquid holding tank;
- a bypass loop for bypassing the wastewater flow around said first valve;
- a second valve, inserted in said bypass loop upstream of said first valve;
- a third valve, inserted in said bypass loop downstream of said second and said first valves, said first, said second, and said third valves being adjustable to meter the bypass flow around said first valve;
- means for injecting a disinfectant into the bypass flow between said second and said third valves; and
- mixing means connected in said bypass loop between said second and said third valves and downstream of said disinfectant injecting means, whereby said disinfectant and said wastewater are intermixed.

* * * * *